United States Patent [19]

Haritonidis et al.

[11] Patent Number: 4,926,696
[45] Date of Patent: May 22, 1990

[54] OPTICAL MICROPRESSURE TRANSDUCER

[75] Inventors: Joseph H. Haritonidis, Cambridge; Stephen D. Senturia, Boston; David J. Warkentin, Cambridge, all of Mass.; Mehran Mehregany, Merriam, Kans.

[73] Assignee: Massachusetts Institute of Technology, Cambridge, Mass.

[21] Appl. No.: 932,780

[22] Filed: Nov. 19, 1986

[51] Int. Cl.$^5$ .................. G01D 5/34; G01L 7/08; G01L 9/00
[52] U.S. Cl. .................. 73/205; 250/231.19; 356/358
[58] Field of Search .......... 73/705, 723, 753; 250/231 P, 231 R, 226; 356/352, 357, 358; 29/569 L

[56] References Cited

U.S. PATENT DOCUMENTS

| | | |
|---|---|---|
| 3,040,583 | 6/1982 | Post .................. 73/705 |
| 4,158,310 | 6/1979 | Ho .................. 73/705 |
| 4,408,123 | 10/1983 | Sichling et al. .................. 250/231 R |
| 4,589,286 | 5/1986 | Berthold, III .................. 73/705 |
| 4,678,902 | 7/1987 | Perlin .................. 73/705 |
| 4,678,909 | 7/1987 | Jackson et al. .................. 73/705 |
| 4,682,500 | 7/1987 | Kazutaka .................. 73/705 |
| 4,711,246 | 12/1987 | Alderson .................. 73/705 |

FOREIGN PATENT DOCUMENTS

85302195.4 10/1985 European Pat. Off. .
86301450.2 10/1986 European Pat. Off. .
1584048 2/1981 United Kingdom .
8132263 5/1982 United Kingdom .

Primary Examiner—Donald O. Woodiel
Attorney, Agent, or Firm—Hamilton, Brook, Smith & Reynolds

[57] ABSTRACT

A thin diaphragm receives pressure across one side and faces a beam splitter on the other side. The beam splitter is integrally attached to the diaphragm and serves as a local optical reference plane for the entire assembly. Coherent light from a light source is partially reflected at the beam splitter. The remainder of the light is reflected from the diaphragm. The reflected beams recombine at a detection point and have a phase difference which is a function of the amount of deflection of the diaphragm. The detected recombined beams are indicative of the deflection of the diaphragm. Optical calibration of the aseembly is a function of the distance between the diaphragm and beam splitter which remains as predefined because the beam splitter is integral with the diaphragm. A vent in the small cavity formed between the diaphragm and beam splitter enables the diaphragm to sense small pressures with increased sensitivity. Through micro-fabrication techniques, the diaphragm is made sensitive to dynamic and static pressure. Detection of the thermal expansion of the assembly as well as deflection of the diaphragm enables a sensed pressure measurement as a differential between the detected thermal expansion and deflection.

32 Claims, 10 Drawing Sheets

OPTICAL MICROPRESSURE TRANSDUCER

DESCRIPTION

Background of the Invention

The sensing of a pressure difference is important in the operations of many systems such as microphones and static pressure gauges. Flexible diaphragms in combination with various readout schemes have been used to detect pressure difference across the diaphragm. A pressure difference across a flexible diaphragm causes the diaphragm to deform. The readout scheme measures this deformation as a function of applied load and thereby provides a measurement of the sensed pressure difference. Typical readout schemes involve a piezoresistive array in the diaphragm or a moveable plate capacitor associated with a fixed plate or fiber optics. One disadvantage with electronic and capacitor schemes is that they are temperature sensitive. Further, most diaphragm pressure sensors are not easily transferred from use to use, are costly and often impractical.

Summary of the Invention

In the present invention, a diaphragm transducer comprises a diaphragm positioned across a chamber from an optical surface. The diaphragm and the optical surface are integrally mounted. The diaphragm or optical surface is a transparent member and the other is a reflective member. The transparent member serves as a local reference plane for the reflective member where a coherent light beam from a source light is split by the transparent member. One part of the split beam illuminates the reflective member through the transparent member. The other part of the split beam is locally reflected off the transparent member to interfere with the beam reflected off the reflective member. The phase difference between the two reflected beams is a function of the amount of deflection of the reflective member. The interference of the two reflected beams creates a pattern indicative of the amount of deflection of the diaphragm and thereby the amount of sensed pressure. A light detector receives the interfering light and produces a measurement of the sensed pressure.

In accordance with the present invention, the diaphragm is supported by a substrate which separates the diaphragm from the optical surface, and forms a well defined gap between the diaphragm and surface. The substrate acts like a spacing layer between the diaphragm and surface, and determines the nominal dimension of the gap. The optics of the unit are calibrated as a function of the gap. Because the optical surface, substrate and diaphragm are integrally attached to each other, the members do not move relative to each other due to movement of the assembly other than deflection of the diaphragm under an applied load. This eliminates the need for recalibration upon movement of the unit because the local reference plane does not change position relative to the sensing diaphragm and the gap is unchanged.

In a preferred embodiment, the diaphragm and substrate are formed together as a single element. The element comprises silicon and is fabricated by micromachining techniques. The small dimensions of the element enable detection of very small pressure changes at a high frequency. Hence, the diaphragm has application in microphones, other acoustic pressure sensors and dynamic pressure systems. In applications where small pressure differences are measured a small vent is made in the gap allowing communication with ambient. In turn, this prevents a pressure buildup behind the diaphragm with deflection. There is thus greater deflection with a given applied load and an increase in sensitivity of the unit.

In accordance with the present invention, the side of the diaphragm facing the optical surface may comprise a metallic layer to enhance the reflective properties of that side. Also, the source light and/or light detector may be positioned at the optical flat to be made part of the unit. Alternatively, the light source and/or light detector may include the use of fiber optics. Further a linear array of light detectors may be used to aid in calibration, quantitative application of the unit and discrimination of interference due to multiple reflection effects.

In another embodiment, a fiber optic assembly is mounted facing one side of the diaphragm and leaving a gap between the fiber end and diaphragm. The fiber end provides the local reference plane for the embodiment. Coherent light from a fiber is partly reflected from the diaphragm. The reflected beams recombine just inside the fiber end and form an interference pattern. The interference pattern is indicative of the deflection of the diaphragm and is received by a light detector at the other end of the fiber which produces a measurement of the sensed pressure.

In accordance with another aspect of the present invention, two optic fibers are mounted to the diaphragm, substrate and optical surface assembly. One fiber is centrally positioned relative to the reflective side of the diaphragm. The fiber provides a source of coherent light and a local reference plane. The light from the fiber is split by the fiber end. Part of the split light beam is reflected off the diaphragm and received by the same fiber end. The remaining part of the split light is locally reflected off the fiber end back into the fiber. The light reflected off the fiber end and the light reflected off the diaphragm interfere with each other inside of the fiber end. The phase difference between the two light beams is a function of the movement of the diaphragm. An interference pattern is formed based on the phases of the two reflected beams of light and is thus indicative of the deformation of the diaphragm and the amount of pressure across the diaphragm. The second fiber is positioned to one side of and facing the reflective side of the diaphragm. This fiber monitors the gap size which may change due to thermal expansion of the diaphragm, substrate and optical surface. The other ends of the two fibers are received by light detector means. The detector means provide a measurement of sensed pressure as a differential between the detected deflection of the diaphragm and gap size change. This arrangement enables pressure detection independent of temperature change.

From the above embodiments, the invention enables the sensing of both static and dynamic pressure. A further embodiment enables the measuring of mechanical properties of a subject diaphragm. Deflection of a diaphragm is a function of size and mechanical properties of the diaphragm. In this embodiment, a known load is applied to a diaphragm of known dimension. The load is known to create certain amounts of deflection for a diaphragm of that size comprising certain materials. By measuring the amount of deflection of the diaphragm, the material and correlating mechanical properties can be determined. The deflection of the subject diaphragm is measured by an interference pattern which is generated by illuminating the diaphragm through an optical surface, or when the subject diaphragm is transparent by illuminating a mirror through the transparent subject diaphragm. The light reflected back through the optical surface or transparent diaphragm intersects the light partially reflected from the optical surface or transparent diaphragm and forms the interference pattern of interest. Light detector means receive the interfering light and produce an indication of the amount of deflection. As in the other embodiments, the subject diaphragm and optical surface or the transparent subject diaphragm and mirror are integrally mounted together across a cavity, and one serves as a local reference plane to the other.

BRIEF DESCRIPTION OF THE DRAWINGS

The foregoing and other objects, features, and advantages of the invention will be apparent in the following more particular description of the preferred embodiments of the invention, as illustrated in the accompanying drawings in which like reference characters refer to the same parts throughout different views. The drawings are not necessarily to scale, emphasis instead being placed upon illustrating the principles of the invention.

FIG. 1b is a cross-sectional view of an embodiment of the invention having a substrate which is integral with the diaphragm.

DETAILED DESCRIPTION OF THE INVENTION

Figure 1A:
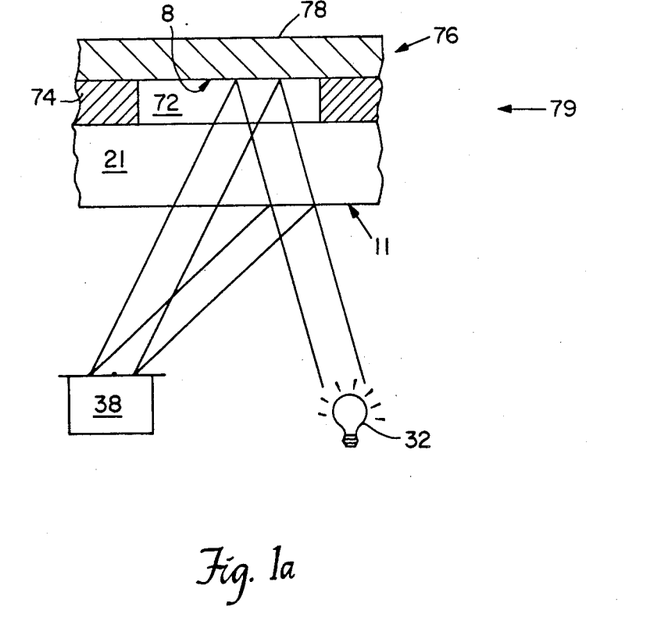
FIG. 1a is a cross-sectional view of a diaphragm pressure transducer embodying the invention with external coherent light source and light detector.

A pressure transducer 29 embodying the present invention is shown in FIG. 1a. The transducer 79 comprises diaphragm 76 supported by substrate 74 which separates the diaphragm 76 from optical flat 21 by a gap 72. The substrate 74 acts as a spacer or spacing layer and determines the nominal dimension of the gap 72. The substrate 74 is attached to the optical flat 21 by an adhesive or other form of bonding such that the diaphragm, substrate and optical flat form an integral unit.

Diaphragm 76 is responsive to a load applied across side 78 and is deformed as a function of the amount of applied pressure. Diaphragm side 8 faces optical flat 21 and is illuminated by coherent light from source 32 through optical flat 21. Reference surface 11 of optical flat 21 provides a local reference plane for the assembly 79. The coherent light is partially reflected at surface 11 and intersects the light reflected from side 8 of the diaphragm at some distance away from reference surface 11. The intersection forms an interference pattern which is indicative of the deflection of diaphragm 76 due to the phase difference between the two reflected beams being a function of the deformation of the diaphragm. The intereference pattern is detected by light detector 38 which produces an indication of sensed pressure from the interference pattern.

A preferred embodiment of the invention is shown in FIG. 1b. The pressure transducer 10 comprises optical flat 19 and diaphragm member 12 in which a substrate is integral with a diaphragm. Diaphragm member 12 is responsive to pressure applied across side 21, and is deformed as a function of the amount of applied pressure. Side 14 of diaphragm member 12 falls optical flat 19 which is attached to diaphragm member 12 by an adhesive such as epoxy. Other forms of bonding or sealing diaphragm member 12 to optical flat 19 may be used. A well defined gap 20 is formed between diaphragm 12 and optical flat 19.

Optical flat 19 provides a local reference plane for the unit. A source light 16 is split by partial reflection from optical flat 19. One part of the split light beam 16 continues through optical flat 19 and reflects off side 14 of diaphragm 12. This reflected beam is shown as beam B in FIG. 1. The other part of the split light beam 16 is locally reflected off optical flat 19. This reflected beam is shown as beam A in FIG. 1b.

Figure 2A:
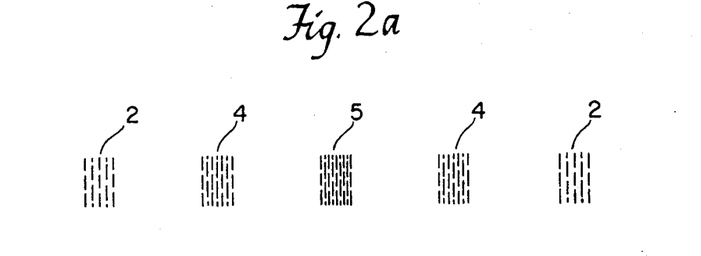
FIG. 2a is an illustration of an interference pattern of light and dark fringes generated by the embodiment of FIG. 1.
Figure 2B:
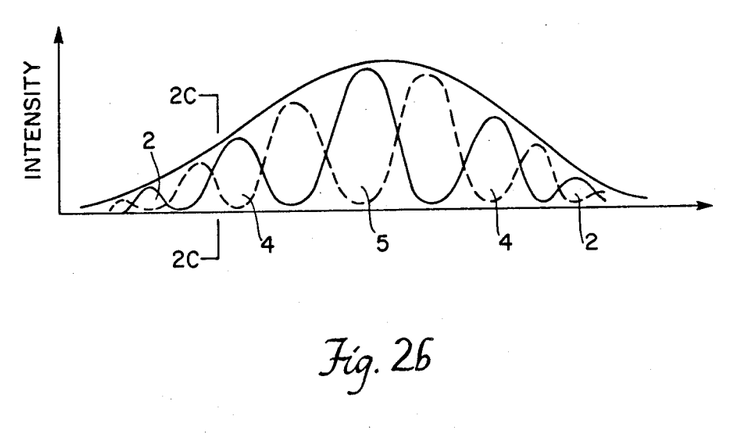
FIG. 2b is the corresponding wave pattern of FIG. 2a with peaks of different intensity within an envelope of the whole interference pattern.

Reflected beams A and B recombine at light detector 18 some distance away from optical flat 19. The recombining of beams A and B forms an interference pattern of fringes 23 which is detected by light detector 18. The interference pattern of fringes at 23 is more clearly shown in FIG. 2a. It is the light and dark fringes of light that form the detected interference pattern. Light fringes are formed by the beams A and B being in phase; dark fringes are formed by the beams being out of phase. Fringes with intermediate brightness are formed as a function of the phase difference between the beams. The recombined beams of light have a Gaussian intensity distribution of these fringes. The fringes at 2 are generated by the low intensity edge of the beams. The fringes at 4 are brighter than the fringes at 2 and are generated by a higher intensity part of the beams than the fringes at 2. The fringes at 5 are the brightest shown and are generated by the central part of the beams which has the highest intensity or peak compared to the other intensities at fringes 2 and 4. Thus, the intensities of the fringes at 2, 4 and 5 are dependent upon their position within the recombined light beams of beam A and B as depicted in FIG. 2b. The wave parts labelled 2, 4, and 5 in FIG. 2b correspond to their respective fringes of light at 2, 4, and 5 in FIG. 2a.

The recombined beam having wave parts 2, 4, and 5 with their respective intensities forms an envelope 9 with an overall intensity. Envelope 9 embodies the whole interference pattern generated by the embodiment of FIG. 1. The envelope 9 does not shift from side to side with the amount of deformation undergone by the diaphragm 12, however the fringes 2, 4 and 5 do. This is due to the direct effect that the deflection of diaphragm 12 has on the phase of light beam B which when recombined with beam A generates a "new" interference pattern. For every half wavelength deflection of diaphragm 12, the light beam B changes one wavelength, and waves at fringes 2, 4, and 5 of envelope 9 shift one position to one side. A shift to one side would be experienced for a concave deflection of diaphragm 12 and a shift to the opposite side for a convex deflection. A whole wavelength change of beam B allows beam B to remain in phase with beam A. As a result, the reunited beams A and B generate a wave with higher intensity, or a shift to one side of the pattern. A quarter or three-fourth wavelength deflection of diaphragm 12 generates a half wavelength change in beam B. A half wavelength change of beam B causes beam B to be out of phase with beam A and therefore has a cancelling affect on the interference pattern. Similarly, fractional wavelength deflections of diaphragm 12 which are between quarter, half and three-fourth wavelength generate a fractional wavelength change in beam B. Fractional wavelength changes of beam B have an intermediate affect on the interference pattern. Fringes at 23 are neither cancelled or intensified. The intensity becomes values in between the two extremes. The change in the interference pattern as a function of the change in deflection of diaphragm 12 is sinusoidal due to the shifting of waves 2, 4, and 5 which are sinusoidal themselves.

Figure 1C:
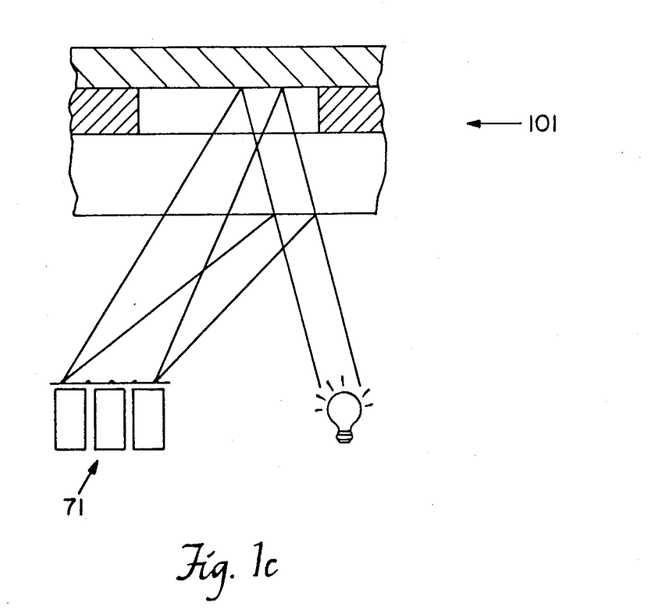
FIG. 1c is a cross section of an embodiment of the invention with a linear array of detectors.
Figure 2C:
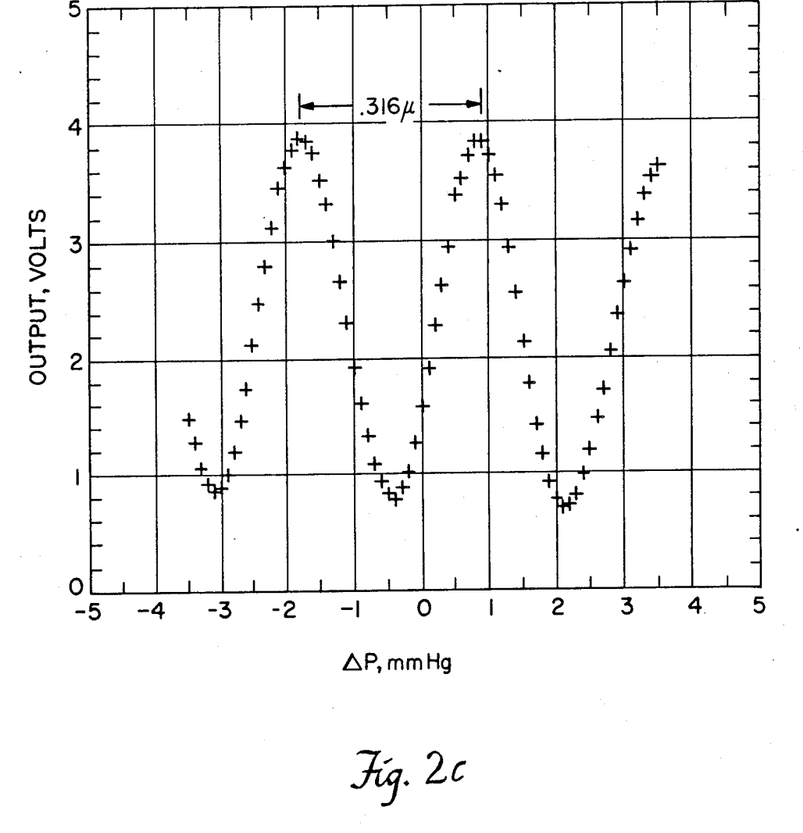
FIG. 2c is a graph of the peaks of that part of the light wave of FIG. 2b which is received by a single light detector positioned at 2c—2c as a function of the pressure difference across the diaphragm in FIG. 1.

A single light detector however, only sees one point of the whole interference pattern. That is, detector 18 only sees one wave part at a time such as wave 2, 4, or 5 of envelope 9 in FIG. 2b. The light received by detector 18 as a function of the pressure difference applied across diaphragm 12 is shown in FIG. 2c. The graph plots the peaks or wave intensities of the light waves within envelope 9 detected by detector 18 as the fringes in envelope 9 shift with a change in sensed pressure and with detector 18 fixed at position 2c—2c in FIG. 2b. Different detectors placed at different positions along the envelope 9 see different intensities to the corresponding fringes 2, 4, 5, but in the same Gaussian distribution of the various patterns when the fringes shift according to sensed pressure. A linear array of detectors shows the position of each detector within the envelope 9 of the interference pattern. From the spatial relationship of the detectors, the phase of each detector relative to the others is obtained. The spatial dependence between each detector and its patter of fringes with various intensities can be related to that of other detectors to reconstruct the whole interference pattern. From this reconstruction, an indication of position within one cycle of the intensity pattern is obtained. Thus, a linear array of detectors reference number 71 may be used as shown in FIG. 1c to aid in the calibration and quantitative application of the unit 101. A linear array of detectors also aids in the discrimination of light interference due to multiple reflection effects.

Figure 1D:
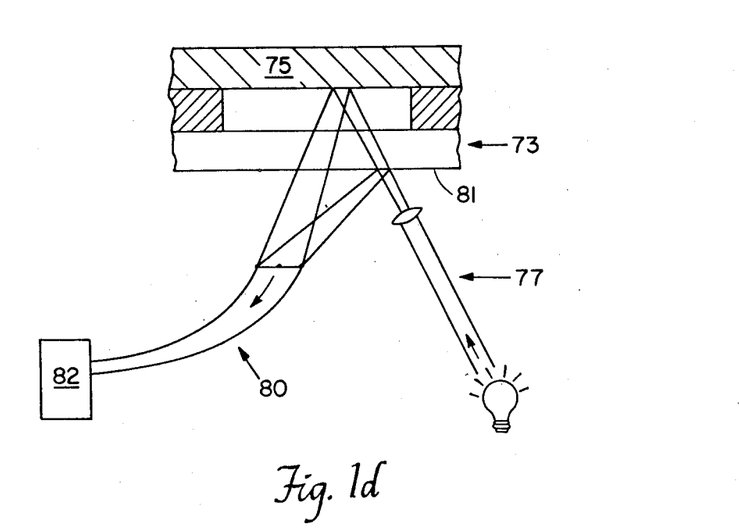
FIG. 1d is a schematic cross secton of a diaphragm transducer embodying the invention with fiber optic light source and light detector.

In alternative embodiments the coherent source light and/or light detector may include fiber optics as shown in FIG. 1d. In such an arrangement optic fiber 77 provides the coherent light beam which is reflected from the diaphragm 75 and partially reflected from reference surface 81 of the optic flat 73. The reflected beams recombine at a distance away from the optic flat 73 and are received by optic fiber 80. At the other end of fiber 80 is a light detector 82 which receives the interference pattern carried through fiber 80 and provides an indication of sensed pressure as a function of the phase difference between the two reflected beams.

Calibration of the unit depends upon the mechanical properties of diaphragm 12. From the mechanical properties of diaphragm 12 the amount of stress due to pressure that is required to cause a certain amount of deformation is known. So, for different measured amounts of deformation, there is an associated known measurement of stress and hence a related pressure measurement.

Calibration of the optics of the unit is dependent upon the distance between the reference plane 19 and diaphragm 12 which defines the dimension of gap 20. In particular the distance away from the unit at which the fringes are formed is a function of the gap dimensions. Because optical flat 19 and diaphragm 12 are attached to each other, they act as an integral body. Optical flat 19 and diaphragm 12 do not move relative to each other when subject to vibration or forces to the whole unit. As a result, gap 20 does not change its dimensions and recalibration of the optics and the unit is unnecessary. Thus, the disadvantage of recalibration in prior art devices is eliminated by the present invention.

The preferred embodiment of the invention is fabricated by micro-machining a thin diaphragm integrally in a silicon substrate. The fabrication process is illustrated in FIGS. 3a through 3d. Silicon wafer 30 is about 250 to 300 m thick. One side of wafer 30 is diffused with a heavy concentration of Boron to form a B+ doped etch stop 13. Other commonly known methods of forming an etch stop are also satisfactory. A masking layer 29 compatible with the etch stop 13 is deposited onto both sides of wafer 30. Mask 29 comprises a silicon oxide layer about 1000 Å thick. Using photolithography techniques a square opening 33 on the order of a millimeter per side is cut in the back side of wafer 30.

Figure 3A:
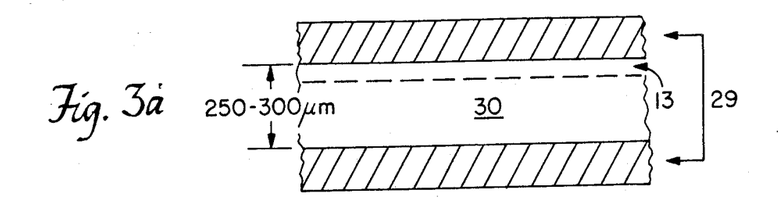
FIGS. 3a through 3d illustrate the fabrication process of a micro-pressure transducer embodying the invention.
Figure 3B:
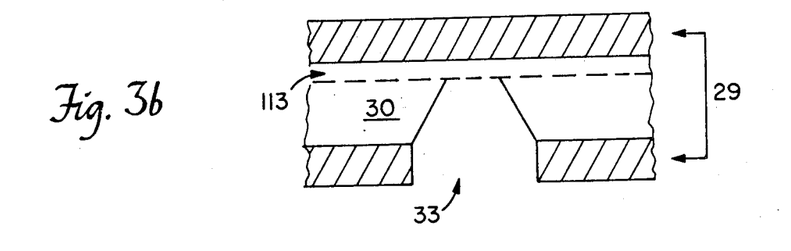
Figure 3C:
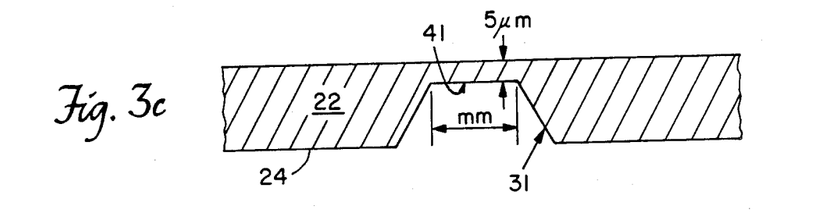

The opening 33 is aligned with the (100) crystal planes of wafer 30. Wafer 30 is then exposed to hydrazine in water which anisotropically etches through opening 33. other known etchants could be used. The exposed (100) crystal planes are etched at a faster rate than the exposed (111) crystal planes due to the properties of the anisotropic etchant. As a result, the etching forms walls 31 at an angle of about 45 degrees from bottom surface 24 as shown in FIG. 3b. Removal of mask 29 leaves a free standing micro-structure 22 shown in FIG. 3c. The micro-structure 22 is a diaphragm about 5 μm thin and a working width of about 1 mm. The diaphragm can have a thickness of about 1 to 100 μm and a diameter in the range of about 100 to 10,000 μm leaving a gap dimension of about 100 to 1000 μm between diaphragm surface 41 and bottom surface 24. If the mask is not removed, the structure is also functional but with a calibration determined by the combination of the silicon diaphragm and the mask.

Figure 3D:
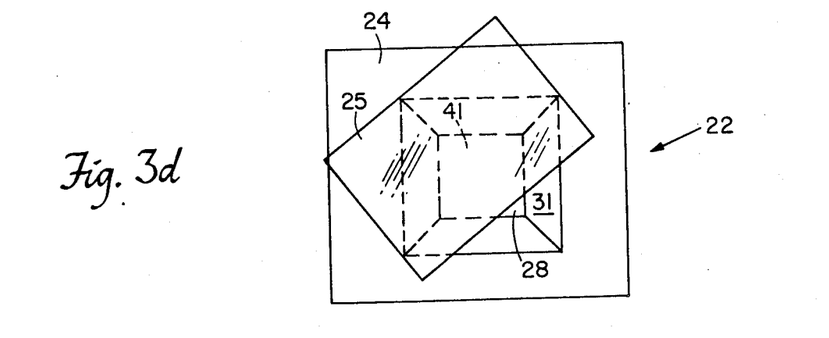

FIG. 3d is a bottom view of micro-structure 22 looking through the etched bottom surface 24 of wafer 30 which is the free standing diaphragm 22. Surface 41 is the reflective side of diaphragm 22. In order to enhance the reflective properties of surface 41, a thin layer comprising aluminum is evaporated onto it. An optical flat 25 is positioned over opening 33 totally covering the opening (not shown here) or leaving a vent 28 as will be further discussed later.

Figure 4:
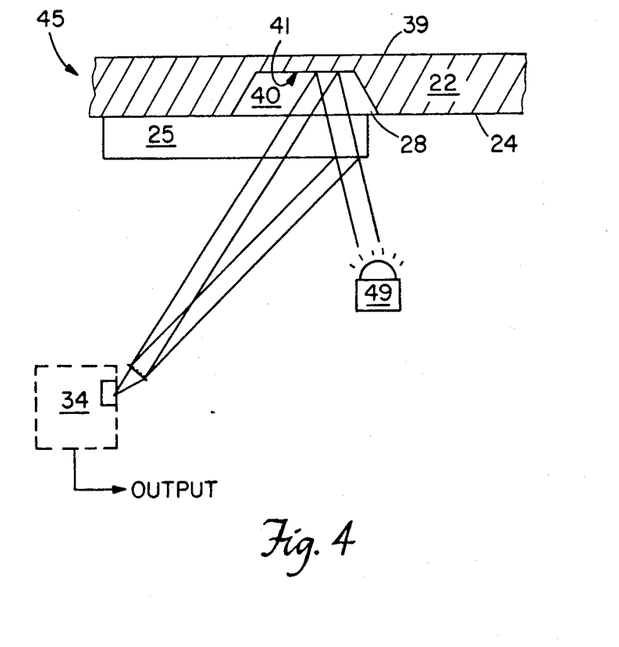
FIG. 4 is a cross sectional view of an acoustic pressure transducer embodying the present invention having a vent.

FIG. 4 shows an embodiment of the invention used as the acoustic pressure transducer in a microphone. Diaphragm 22 having an integral substrate deforms an amount which is proportional to the acoustic pressure applied across the top surface 39. Light from a light source 49 is split by optical flat 25 serving as a local reference plane. Part of the source light is reflected off surface 41 of diaphragm 22 in proportion to the amount of deformation of diaphragm 22. The remaining part of the source light is reflected off optical flat 25 and recombined with the light reflected off diaphragm 22. The recombined light beams form an interference pattern indicative of the amount of deflection of diaphragm 22 and thereby the sensed acoustic pressure. A phototransister 34 receives the interference pattern. The amount of light received by the light detector 34 depends on the amount of deflection of the diaphragm 22. Hence, the light received varies with acoustic pressure. In turn, the amount of light received produces a corresponding current. The current generates an output to other electronics or a computer to reproduce the subject acoustics by methods which are common in the art.

In applications where increased sensitivity is needed, optical flat 25 is attached to diaphragm 22 as shown in FIG. 3d leaving a small vent 28. In other applications, the optical flat can be attached to the diaphragm as in FIG. 1a. The vent 28 allows cavity 40 to communicate with ambient. If the cavity were completely sealed, any load across the top surface 39 of diaphragm 22 would generate a back pressure at surface 41 from within the cavity. Consequently, movement of the diaphragm is partially inhibited thus reducing sensitivity of the diaphragm. However, vent 28 allows air to freely pass through cavity 40 and prevents the build up of any back pressure. This in turn, increases the sensitivity of diaphragm 22. A very small pressure difference across the top surface 39 produces large fringe movement within the recombined beam envelope. Thus, a very thin diaphragm and no back pressure build up as in the foregoing embodiment provides an acoustic pressure transducer with greater sensitivity than an acoustic pressure transducer with a sealed gap similar to the embodiments in FIGS. 1a and 1b.

Another embodiment of the invention is shown in FIG. 5. This embodiment is used for the measuring of material characteristics of the diaphragm under a known load. Deformation of a diaphragm is a function of the size and mechanical properties of the diaphragm. Hence, as in the calibration process, a certain amount of bowing in the diaphragm is correlated by mechanical properties to the amount of pressure required to produce the stress which causes that amount of deformation. Thus, mechanical properties of a material can be determined by measuring the amount of deformation of a diaphragm comprising that material under a known load and with a known diaphragm size and thickness.

Figure 5A:
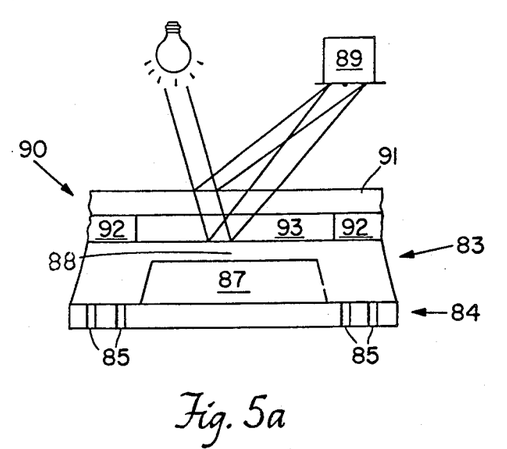
FIG. 5a is a cross section of an embodiment used for determining mechanical properties of a subject diaphragm.

In the embodiment of FIG. 5a, diaphragm member 83 having a substrate integral with a diaphragm 88 is vacuum attached to support 84 through vacuum chucks 85. Cavity 87 is formed between the diaphragm member 83 and the support 84. The diaphragm 88 comprises the subject material with predetermined dimensions. An optical flat 90 is attached to diaphragm member 83 by spacers 92. Spacers 92, diaphragm member 83 and optic flat 90 define gap 93. A vacuum is created in cavity 87 which in turn creates a known load across the top surface of diaphragm 88. A coherent light beam is partially reflected off optical flat 90 at reference surface 91 to provide a local reference for light reflected off diaphragm 88. The two reflected beams recombine to form an interference pattern which is indicative of the amount of deflection undergone by diaphragm 88. The mechanical properties of the subject material are determined from the amount of deflection that is detected by light detector 89 which receives the interference pattern.

Figure 5B:
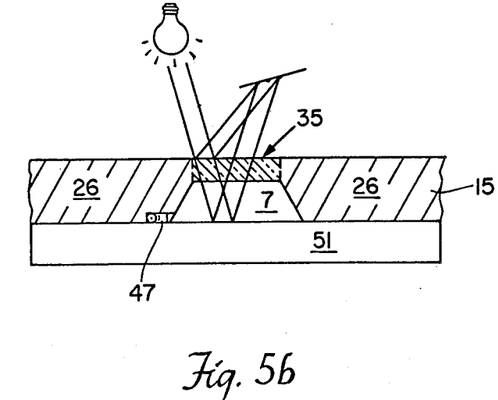
FIG. 5b is a cross-sectional view of another embodiment used for determining mechanical properties of a subject diaphragm.

In an alternative embodiment shown in FIG. 5b, diaphragm assembly 15 is attached to a mirror 51 at a fixed, predetermined distance apart. The diaphragm 35 of diaphragm assembly 15 is transparent and comprises the subject material in a known shape and thickness. Diaphragm 35 is supported by silicon legs 26. A cavity 7 is formed between diaphragm 35 and mirror 51. Vacuum chamber 47 is used to create a vacuum within cavity 7 which creates a known load across the top surface of diaphragm 35. A coherent source light is reflected off mirror 51 to provide a local reference for light reflected off diaphragm 35. The light reflected off mirror 51 is recombined with light reflected off diaphragm 35. The recombined light generates an interference pattern which is indicative of the amount of the deformation undergone by diaphragm 35. In turn, the mechanical properties of the subject material are determined from the detected amount of deflection, the known thickness of diaphragm 35 and the known applied load.

Further, the optic references provided by optic flat 90 in FIG. 5a and mirror 51 in FIG. 5b are local and at a set calibration due to optic flat 90 and mirror 51 being fixed at a predetermined distance apart from diaphragm 88 of FIG. 5a and 35 of FIG. 5b. Recalibration of the optics after movement or vibration of the unit is unnecessary as long as optic flat 90 and mirror 51 remain integral with diaphragm 88 and 35, respectively, and gap 93 of FIG. 5a and cavity 7 of FIG. 5b remain unchanged.

Figure 6:
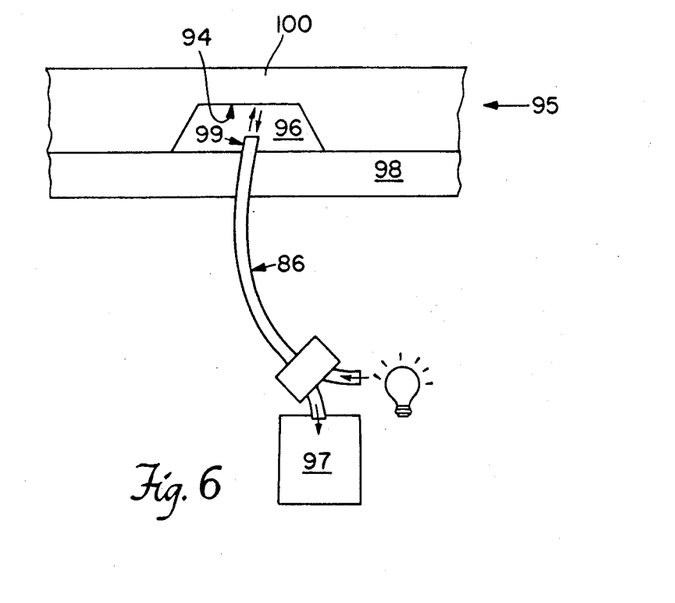
FIG. 6 is a schematic view of an embodiment with a fiber optic reference plane.

Another embodiment of the invention is shown in FIG. 6. Fiber bundle 86 is mounted to a support 98 facing diaphragm surface 94 of diaphragm assembly 95. Diaphragm assembly comprises a substrate integral with a diaphram 100. Diaphragm assembly 95 is attached to support 98 forming defined gap 96. A coherent light beam from fiber 86 is reflected off diaphragm surface 94 and is received by fiber end 99. The coherent light is also partially reflected at end 99 of fiber 86 back into the fiber such that the fiber end 99 serves as a fixed local reference plane. The two reflected beams recombine within fiber 86 and form an interference pattern indicative of the amount of deflection of diaphragm 100 of diaphragm assembly 95. This is due to the phase difference of the two reflected beams being a function of the amount of deflection of the diaphragm 100 and thereby the sensed pressure. Light detector 97 receives the interference pattern through the other end of optic fiber 86 and provides an indication of sensed pressure.

Figure 7:
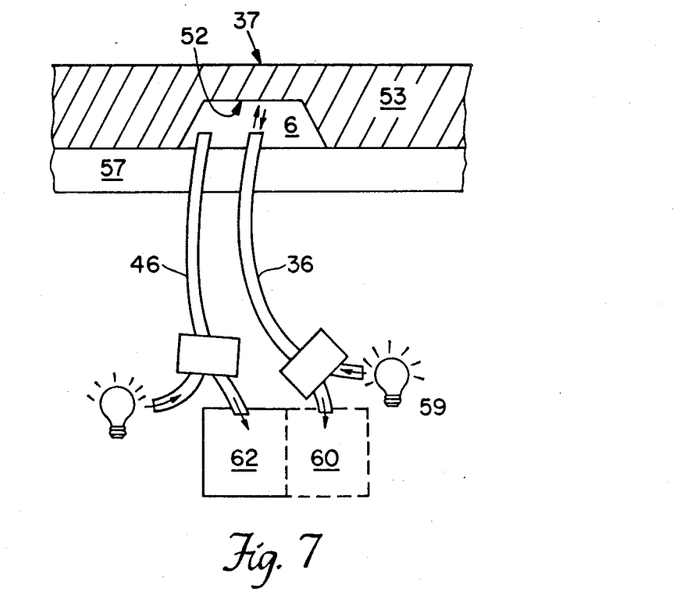
FIG. 7 is a schematic cross-sectional view of a pressure transducer embodying the invention with fiber optic light source and thermal monitor for high temperature application.

Another embodiment of the invention for use in a wide variety of temperatures is shown in FIG. 7. Diaphragm assembly 53 having a substrate integral with a diaphragm is responsive to a load applied on top central surface 37 and has a reflective surface 52. Two optic fibers or fiber optic bundles 36 and 46 are attached a fixed distance away from reflective surface 52 of diaphragm assembly 53. One end of fiber optic bundle 36 is centrally positioned with respect to diaphragm assembly 53 and serves as a fixed local reference plane. Coherent light from light source 59 is split by partial reflection at the end face of fiber bundle 36. The transmitted part of the split light is reflected off surface 52 of diaphragm 53 and received at the end of fiber bundle 36. The phase of the light reflected and received by fiber bundle 36 is a function of the amount of deformation of the central area of diaphragm assembly 53 and thereby the amount of applied load. The beams reflected off fiber bundle end face 36 and surface 52 are recombined within the fiber bundle 36. The recombined light beams form an interference pattern indicative of the amount of deflection of the central area of diaphragm assembly 53. The other end of fiber bundle 36 is connected to light detector means 60 which receives the interference pattern. Detector means 60 produces a signal indicative of the amount of detected deflection.

In an environment of high or changing temperature, the deflection of diaphragm assembly 53 may partly be due to thermal expansion of diaphragm assembly 53 and mounting means 57 and not solely due to pressure applied across surface 37. Fiber optic bundle 46 is used to monitor such thermal expansion of mounting means 57 and diaphragm assembly 53. One end of fiber optic bundle 46 is mounted facing and to one side of reflective surface 52 of diaphragm assembly 53. The other end of fiber bundle 46 is received by light detector means 62 which generates a signal indicative of sensed thermal expansion. The signals from light detector means 60 and 62 are electrically combined to produce an indication of sensed pressure as a differential between the measured and calibrated deflection and deflection due to thermal expansion.

The diaphragm assembly 53, mounting means 57 and fiber bundles 36 and 46 are the only parts that are exposed to the high temperatures of a testing environment. Hence, the use of fiber optics enables wide temperature application of the pressure transducer. A pressure of about 200 psi can be detected in about a 400° F. environment. In contrast, prior art devices involving piezoresistors and integral electronics are inoperable at such high temperatures.

Further, total deflection of diaphragm 53 is about 12 microns, and about 40 different intensity fringes are generated in the interference pattern. The numerous fringes allows a wide range of pressure measurements to be made in all of the foregoing embodiments.

Figure 8:
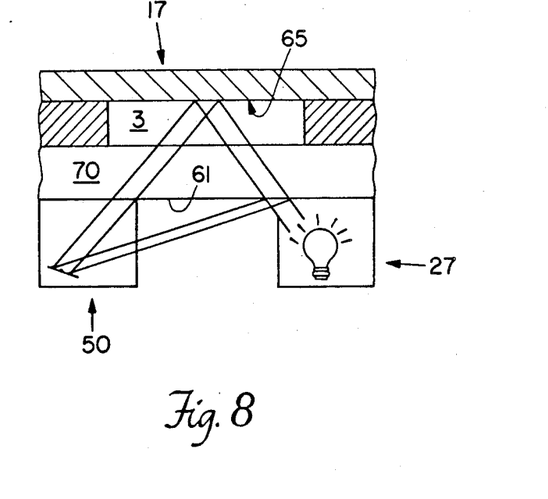
FIG. 8 is a cross-sectional view of a pressure transducer embodying the present invention with integrated light source and light detector.

In some applications, it may be more useful to have the source light and/or light detector attached to the unit to make a more complete device. FIG. 8 illustrates one such embodiment where both the source light 27 and light detector 50 are positioned at the surface of the optical flat 70. This arrangement still provides a diaphragm 17 attached to optical flat 70 forming a fixed cavity 3. Optical flat 70 serves as a local, fixed reference plane which splits light from light source 27. One part of the split light beam is reflected at reference surface 61 of optical flat 70 and received by light detector 50. The remaining part of the split source light beam is reflected off reflective surface 65 of diaphragm 17. The phase difference between the light beam reflected off diaphragm surface 65 and the light beam reflected off reference surface 61 is a function of the amount of deflection of the diaphragm 17. The amount of deflection of diaphragm 17 is a function of the sensed pressure. Hence, the light received by light detector 50 is indicative of the pressure difference across diaphragm 17. The light received by light detector 50 is in the form of an interference pattern. The interference pattern comprises light and dark fringes made by the recombining of the beams reflected off optical flat surface 61 and diaphragm surface 65. If the reflected beams are in phase with each other then, bright fringes are generated. Dark fringes are generated when the reflected beams are out of phase and are recombined. From this interference pattern, light detector 50 is calibrated to produce a measurement of sensed pressure. Further, vibration or movement of the device does not pose the problem of recalibration as calibration is dependent upon fixed gap 3. As long as diaphragm 17 remains integral with optical flat 70, no relative movement between diaphragm 17 and optical flat 70 is experienced, and the device provides a practical, wide measurement range well calibrated pressure transducer.

While the invention has been particularly shown and described with reference to the preferred embodiments thereof, it will be understood by those who are skilled in the art that there are changes in form and detail that may be made without departing from the spirit and scope of the invention as defined in the appended claims.

We claim:

1. A diaphragm transducer involving Michelson-type interferometry comprising:
   a diaphragm micromachined into a substrate, the diaphragm being responsive to pressure;
   an optical surface connected to the substrate with a defined gap between the diaphragm and the optical surface, wherein one of the diaphragm and the surface is a transparent member and the other is a reflective member, where said transparent member serves as a fixed local reference plane by splitting a coherent source light beam into a locally reflected beam part and a transmitted beam part, the locally reflected beam part being immediately reflected from and the transmitted beam part being transmitted through a common surface of the transparent member such that the transmitted beam part of the split source beam is reflected off said reflective member and transmitted back through the transparent member, and the locally reflected beam part of the split source beam is reflected locally off the transparent member in a direction away from the reflective member to interfere with said transmitted beam part transmitted back through the transparent member after being reflected off the reflective member, the interference being indicative of the amount of deflection of the diaphragm due to a pressure applied across the diaphragm; and
   light detector means for detecting the interfering light and producing an indication of the amount of deflection.

2. A diaphragm transducer as claimed in claim 1 wherein the optical surface and diaphragm are connected so as to form an integral unit such that said optical surface and diaphragm do not move relative to each other side from deflection of the diaphragm under pressure but rather move as a unit and thereby maintain the gap as initially defined.

3. A diaphragm transducer as claimed in claim 2 wherein the optical surface is connected to the diaphragm by a substrate which serves as a spacing layer and determines the nominal dimension of the gap.

4. A diaphragm transducer as claimed in claim 1 wherein when the diaphragm is the reflective member, said diaphragm has a reflective surface comprising a metallic layer.

5. A diaphragm transducer as claimed in claim 1 wherein the light source is attached to the optical surface.

6. A diaphragm transducer as claimed in claim 5 wherein said light detector is attached to the optical surface.

7. A diaphragm transducer as claimed in claim 6 wherein said light source and light detector involve fiber optics.

8. A diaphragm transducer as claimed in claim 1 wherein the transducer is dimensioned such that the diaphragm has a diameter in the range of about 100 to 10,000 microns and has a thickness in the range of about 1 to 100 microns and the gap has a dimension in the range of about 100 to 1000 microns between the diaphragm and the optical surface.

9. A diaphragm transducer as claimed in claim 1 wherein the source light is a laser beam.

10. A diaphragm transducer as claimed in claim 9 wherein the laser is attached to the optical surface.

11. A diaphragm transducer as claimed in claim 1 further including fiber optic means to provide the coherent source light.

12. A diaphragm transducer as claimed in claim 1 wherein the light detector means includes fiber optics.

13. A diaphragm transducer as claimed in claim 1 wherein the optical surface is connected to the diaphragm leaving a small vent which allows the gap to communicate with ambient.

14. A diaphragm transducer as claimed in claim 1 wherein the light detector means includes a linear array of detectors.

15. A diaphragm transducer involving Michelson-type interferometry comprising:

a micromachined diaphragm and an optical surface positioned opposite each other across a chamber, the diaphragm and surface being integrally mounted, wherein one of the diaphragm and surface is a transparent member which serves as a fixed local reference plane by splitting a coherent light into a locally reflected beam part and a transmitted beam part and the other is a reflective member;

illuminating means for illuminating the reflective member through a common surface of the transparent member such that coherent light transmitted through the transparent member and reflected from the reflective member back through the transparent member intersects coherent light immediately reflected from the common surface of the transparent member in a direction away from the reflective member, the light intersecting at a detection area in interference relationship; and light detector means for providing an indication of the light interference at the detection area as an indication of deformation of the diaphragm.

16. A diaphragm transducer as claimed in claim 15 wherein the diaphragm has a metallic surface.

17. A diaphragm transducer as claimed in claim 15 wherein the illuminating means is integrally connected to the device.

18. A diaphragm transducer as claimed in claim 17 wherein the light detector means are integrally related to the device.

19. A diaphragm transducer as claimed in claim 17 wherein the illuminating means is a laser.

20. A diaphragm transducer as claimed in claim 17 wherein the illuminating means include fiber optics.

21. A diaphragm transducer as claimed in claim 20 wherein the light detector means include fiber optics.

22. A diaphragm transducer as claimed in claim 15 wherein the illuminating means is a laser.

23. A diaphragm transducer as claimed in claim 15 wherein the illuminating means includes fiber optics.

24. A diaphragm transducer as claimed in claim 15 wherein the light detector means includes fiber optics.

25. A diaphragm transducer as claimed in claim 15 further including a vent which allows the chamber to communicate with ambient.

26. A diaphragm transducer as claimed in claim 15 wherein the light detector means include a linear array of light detectors.

27. A diaphragm transducer involving Michelson-type interferometry comprising:

a diaphragm and an end of an optic fiber, serving as a fixed local reference plane by splitting light into a locally reflected beam part and a transmitted beam part, positioned opposite each other across a gap, the diaphragm and fiber end being integrally mounted, wherein light emitted from the fiber end is reflected from the diaphragm back into the fiber end such that the reflected light intersects light which was immediately reflected at the fiber end in a direction back through the optic fiber, the intersection forming an interference indicative of the deformation of the diaphragm; and light detecting means for providing an indication of the deformation of the diaphragm, said detecting means receiving the interference at an opposite end of the optic fiber.

28. A diaphragm transducer involving Michelson-type interferometry comprising:

a substrate having a diaphragm micromachined therein, the diaphragm being responsive to pressure;

an optical surface connected to the substrate with a defined gap between the diaphragm and the optical surface, wherein one of the diaphragm and the surface is a transparent member and the other is a reflective member, where said transparent member serves as a fixed local reference plane by splitting a coherent source light beam into a transmitted part and a locally reflected part, the transmitted part of the split beam being transmitted through the transparent member to the reflective member and reflected off said reflective member back through the transparent member and the locally reflected part of the split beam being immediately reflected off the transparent member in a direction away from the reflective member to interfere with said transmitted part transmitted back through the transparent member after being reflected off the reflective member, the interference being indicative of the amount of deflection of the diaphragm due to a pressure applied across the diaphragm, the coherent source light beam being from a light source attached to the optical surface; and light detector means for detecting the interfering light and producing an indication of the amount of deflection.

29. A diaphragm transducer as claimed in claim 28 wherein the light detector is attached to the optical surface.

30. A diaphragm transducer involving Michelson-type interferometry comprising:

a substrate having a diaphragm micromachined therein, the diaphragm being responsive to pressure;

an optical surface connected to the substrate with a defined gap between the diaphragm and the optical surface, wherein one of the diaphragm and the surface is a transparent member and the other is a reflective member, where said transparent member serves as a fixed local reference plane by splitting a laser beam into a transmitted part and a locally reflected part, the transmitted part of the split beam being transmitted through the transparent member to the reflective member and reflected off said reflective member back through the transparent member, and the locally reflected part of the split beam being immediately reflected off the transparent member in a direction away from the reflective member to interfere with said transmitted part transmitted back through the transparent member after being reflected off the reflective member, the interference being indicative of the amount of deflection of the diaphragm due to a pressure applied across the diaphragm, the laser being attached to the optical surface; and light detector means for detecting the interfering light and producing an indication of the amount of deflection.

31. A diaphragm transducer involving Michelson-type interferometry comprising:

a substrate having a diaphragm micromachined therein, the diaphragm being responsive to pressure;

an optical surface connected to the substrate with a defined gap between the diaphragm and the optical surface, wherein one of the diaphragm and the surface is a transparent member and the other is a reflective member, wherein said transparent member serves as a fixed local reference plane by splitting a coherent source light beam into a transmitted part and a locally reflected part, the transmitted part of the split beam being transmitted through the transparent member to the reflective member and reflected off said reflective member back through the transparent member, and the locally reflected part of the split beam being immediately reflected off the transparent member in a direction away from the reflective member to interfere with said transmitted part transmitted back through the transparent member after being reflected off the reflective member, the interference being indicative of the amount of deflection of the diaphragm due to a pressure applied across the diaphragm; and light detector means for detecting the interfering light and producing an indication of the amount of deflection, the light detector means having a linear array of detectors.

32. A diaphragm transducer involving Michelson-type interferometry comprising:

a micromachined diaphragm and an optical surface positioned opposite each other across a chamber, the diaphragm and surface being integrally mounted, wherein one of the diaphragm and surface is a transparent member, which serves a fixed local reference plane by splitting a coherent light into a locally reflected beam part and a transmitted beam part and the other is a reflective member;

illuminating means for illuminating the reflective member through the transparent member such that coherent light reflected from the reflective member back through the transparent member intersects coherent light immediately reflected from the transparent member in a direction away from the reflective member, the light intersecting at a detection area in interference relationship; and light detector means for providing an indication of the light interference at the detection area as an indication of deformation of the diaphragm, the light detector means including a linear array of light detectors.

* * * * *

UNITED STATES PATENT AND TRADEMARK OFFICE
CERTIFICATE OF CORRECTION

PATENT NO. : 4,926,696

DATED : May 22, 1990

INVENTOR(S) : Joseph H. Haritonidis, Stephen D. Senturia, David J. Warkentin and Mehran Mehregany It is certified that error appears in the above-identified patent and that said Letters Patent is hereby corrected as shown below:

Col. 1 line 3 before "Background of the Invention" insert

-- This invention was made with government support under contract Number N00014-87-K-0048 awarded by the U.S. Department of the Navy. The government has certain rights in the invention.---

Signed and Sealed this

Eighth Day of December, 1992

Attest:

DOUGLAS B. COMER

Attesting Officer

Acting Commissioner of Patents and Trademarks